(12) United States Patent
Lutz et al.

(10) Patent No.: US 11,227,280 B2
(45) Date of Patent: Jan. 18, 2022

(54) SYSTEMS AND METHODS FOR INCREASED EFFICIENCY AND RELIABILITY OF CONTACTLESS CARD TRANSACTIONS

(71) Applicant: Capital One Services, LLC, McLean, VA (US)

(72) Inventors: Wayne Lutz, Fort Washington, MD (US); Jeffrey Rule, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 79 days.

(21) Appl. No.: 16/363,511

(22) Filed: Mar. 25, 2019

(65) Prior Publication Data

US 2020/0311714 A1    Oct. 1, 2020

(51) Int. Cl.
*G06Q 20/34* (2012.01)
*G06K 7/00* (2006.01)
*G06Q 20/32* (2012.01)

(52) U.S. Cl.
CPC ......... *G06Q 20/352* (2013.01); *G06K 7/0008* (2013.01); *G06Q 20/3278* (2013.01)

(58) Field of Classification Search
CPC .......................... G06Q 20/352; G06K 7/0008
USPC ......................................................... 705/41
See application file for complete search history.

(56) References Cited

U.S. PATENT DOCUMENTS

| | | |
|---|---|---|
| 7,375,616 B2 | 5/2008 | Rowse et al. |
| 7,481,360 B1 * | 1/2009 | Ramachandran ...... G06Q 20/18 |
| | | 235/379 |
| 7,652,578 B2 | 1/2010 | Braun et al. |
| 8,060,012 B2 | 11/2011 | Sklovsky et al. |
| 8,103,249 B2 | 1/2012 | Markison |
| 8,140,010 B2 | 3/2012 | Symons et al. |
| 8,150,321 B2 | 4/2012 | Winter et al. |
| 8,196,131 B1 | 6/2012 | von Behren et al. |
| 8,811,892 B2 | 8/2014 | Khan et al. |

(Continued)

FOREIGN PATENT DOCUMENTS

| | | |
|---|---|---|
| JP | 5994996 B2 | 9/2016 |
| JP | 2018512638 A | 5/2018 |

(Continued)

OTHER PUBLICATIONS

NASDAQ OMX Corporate Solutions, Inc./News Wire, Global Near Field Communications Market 2018-2023: $23 Bn Market Gaining Traction Due to its Broad Adoption in Smartphones and Tablets, Jan. 24, 2019, NASDAQ OMX's News Release Distribution Channel, Globe Newswire, (2 pages) (Year: 2019).*

(Continued)

*Primary Examiner* — Benjamin S Brindley
(74) *Attorney, Agent, or Firm* — Hunton Andrews Kurth LLP

(57) ABSTRACT

Example embodiments of systems and methods for performing a transaction involving a transmitting device and a receiving device. A state machine may be configured to monitor the data communications, data reads, and data writes performed between the transmitting device and the receiving device. In the event of a disruption during the transaction, the state machine may allow the transaction to resume following the most recent data communication, data read, or data write once the disruption is resolved.

20 Claims, 11 Drawing Sheets

Interruption Interface (630)

(56) References Cited

U.S. PATENT DOCUMENTS

| | | | |
|---|---|---|---|
| 9,230,254 B1* | 1/2016 | Sharifi Mehr | G06Q 20/24 |
| 10,163,107 B1* | 12/2018 | White | G06Q 20/102 |
| 2006/0044153 A1 | 3/2006 | Dawidowsky | |
| 2009/0058594 A1 | 3/2009 | Nakagawa et al. | |
| 2010/0207742 A1 | 8/2010 | Buhot et al. | |
| 2010/0240413 A1 | 9/2010 | He et al. | |
| 2011/0042456 A1 | 2/2011 | Masaryk et al. | |
| 2012/0196583 A1 | 8/2012 | Kindo | |
| 2012/0238206 A1 | 9/2012 | Singh et al. | |
| 2012/0246079 A1* | 9/2012 | Wilson | G06Q 20/3226 705/67 |
| 2012/0252350 A1 | 10/2012 | Steinmetz et al. | |
| 2012/0317628 A1 | 12/2012 | Yeager | |
| 2013/0054474 A1* | 2/2013 | Yeager | G06Q 20/02 705/71 |
| 2013/0303085 A1 | 11/2013 | Boucher et al. | |
| 2014/0040120 A1* | 2/2014 | Cho | G06Q 20/3278 705/39 |
| 2014/0263625 A1* | 9/2014 | Smets | G06Q 20/352 235/380 |
| 2015/0178724 A1 | 6/2015 | Ngo et al. | |
| 2016/0055480 A1* | 2/2016 | Shah | G06Q 20/36 705/21 |
| 2016/0057619 A1* | 2/2016 | Lopez | G06F 9/455 380/247 |
| 2016/0092696 A1 | 3/2016 | Guglani et al. | |
| 2016/0253651 A1 | 9/2016 | Park et al. | |
| 2016/0307089 A1 | 10/2016 | Wurmfeld et al. | |
| 2017/0083728 A1* | 3/2017 | Takeuchi | H04L 67/142 |
| 2018/0139608 A1* | 5/2018 | Wilson | G06Q 20/3229 |
| 2019/0005491 A1* | 1/2019 | Grassadonia | G06Q 20/32 |
| 2019/0096177 A1* | 3/2019 | Sepich | G07F 17/3227 |
| 2019/0172037 A1* | 6/2019 | O'Donoghue | G06F 21/6245 |

FOREIGN PATENT DOCUMENTS

| | | |
|---|---|---|
| KR | 20130041358 A | 4/2013 |
| WO | 2011/127687 A1 | 10/2011 |

OTHER PUBLICATIONS

"Contactless Specifications for Payment Systems," EMV Book B—Entry Point Specification, (2016), downloaded from https://www.emvco.com/wp-content/uploads/2017/05/BookB_Entry_Point_Specification_v2_6_20160809023257319.pdf.

Notification of Transmittal of the International Search Report and the Written Opinion of the International Searching Authority issued in PCT/US2020/022349, dated Jun. 11, 2020.

* cited by examiner

200

300

Card Reading Interface (620)

600

Interruption Interface (630)

600

Resumed Reading Interface (640)

600

Transaction Complete Interface (650)

600

SYSTEMS AND METHODS FOR INCREASED EFFICIENCY AND RELIABILITY OF CONTACTLESS CARD TRANSACTIONS

FIELD OF THE INVENTION

The present disclosure relates to actions, transactions, and other operations performed between a transmitting device, such as a contactless card, and a receiving device, and more particularly, to systems and methods including state machines to facilitate the resumption of a disrupted action, transaction, or operation involving a transmitting device and a receiving device.

BACKGROUND

Completing a transaction between a contactless card and a point of sale (POS) device or other terminal, such as a mobile phone, laptop computer, desktop computer, or kiosk, using near field communication (NFC) requires the communication of data between the card and the device or terminal, and a single transaction may comprise a plurality of data communications, data reads, and data writes. If the communication of data is disrupted during the transaction for any reason, e.g., due to the movement of the card outside of the communication field of the POS device or terminal, the transaction may be interrupted. Upon interruption the transaction may fail and any progress made in the transaction may be lost. Accordingly, the initiation of a new transaction between the card and the POS device or terminal may be required.

In addition, a POS device or other terminal may be configured to generate an NFC field for conducting a transaction with a contactless card that may require less power than other forms of wireless communication. However, the reduced power requirement of NFC fields may cause NFC to be a weaker and less reliable than more power-intensive forms of wireless communication. Thus, the benefit of a reduction in power consumption for a POS device or other terminal generating an NFC field may have a detrimental effect on transaction speed and/or reliability and may lead to more frequent disruption of transactions. This effect may be particularly detrimental when the contactless card is communication with a mobile device through an NFC field generated by the mobile device.

These and other deficiencies exist. Accordingly, there is a need to provide users with an appropriate solution that overcomes at least some of these deficiencies to provide data and transaction security, authentication, and verification for contactless cards, as well as increasing the reliability and speed of transactions involving contactless cards.

SUMMARY

Aspects of the disclosed technology include systems and methods for performing an action, transaction, or other operation between a transmitting device, such as a contactless card, and a receiving device, such as a client device. Various embodiments describe systems and methods where a state machine is used to facilitate the resumption of the action, transaction, or other operation following a disruption.

Embodiments of the present disclosure provide a transaction system comprising: a transmitting device having a processor and a memory; a receiving device having a processor and a memory; and a state machine in data communication with one or more of the processor of the transmitting device and the processor of the receiving device, wherein, upon initiation of a transaction involving the transmitting device and the receiving device, the state machine is configured to communicate with the transaction application and record one or more of a data communication, data read, and a data write between the transmitting device and the receiving device, wherein, upon the occurrence of a disruption that interrupts the transaction, the state machine is configured to preserve the most recent data communication, data read, and data write between the transmitting device and the receiving device, and wherein, upon resolution of the disruption, the state machine is configured to resume the transaction at a resumption step immediately following the most recent data communication, data read, and data write between the transmitting device and the receiving device.

Embodiments of the present disclosure provide a method of performing a transaction comprising the steps of: providing a receiving device comprising a processor, a memory, and a communication interface; generating, by the communication interface, a communication field; entering, by a transmitting device, into the communication field, the transmitting device containing a processor and a memory; initiating, by the transmitting device, a transaction involving the receiving device; engaging, by the transmitting device, a state machine; recording, by the state machine, one or more data reads performed by the receiving device in connection with the transaction; exiting, by the transmitting device, the communication field and disrupting the transaction; re-entering, by the transmitting device, the communication field; and resuming, by the state machine, the transaction at a resumption step immediately following one of the one or more data reads.

Embodiments of the present disclosure provide a client device for performing a transaction, comprising: a processor; a memory containing a state machine; a near field communication (NFC) interface configured to generate an NFC field; wherein, upon entry of a contactless card into the NFC field, the processor is configured to: initiate a transaction involving the contactless card, and engage a state machine to preserve the most recent data read performed by the client device; and wherein, upon exit of the contactless card from the NFC field prior to the completion of the transaction, the processor is configured to: retrieve the most recent data read performed by the client device from the state machine, and resume the transaction at a step immediately following the most recent data read.

Further features of the disclosed techniques, and the advantages offered thereby, are explained in greater detail hereinafter with reference to specific example embodiments illustrated in the accompanying drawings, wherein like elements are indicated be like reference designators.

DETAILED DESCRIPTION OF EXAMPLE EMBODIMENTS

Systems and methods described herein are directed to improving efficiency and reliability for a transaction, such as Europay®, MasterCard®, and Visa® transactions (known as EMV transactions), or other transactions, operations, or interactions, between a contactless card and a device.

For example, during the transaction the device and the contactless card may interact and may perform several exchanges of data. Initially, the contactless card may be read and an application may be selected on the device. The device may be configured to transmit, and the contactless card may be configured to receive, one or more requests associated with card data prior to authorization. These exchanges may occur over a period of time, e.g., a duration of one, two or three or more seconds. If the contactless card is positioned outside a read area on the device, or moved outside of the read area, at any point during this period of time, the transaction may be disrupted.

Exemplary embodiments of the system and methods described herein may include a state machine configured to record one or more reads conducted from the contactless card on the device. If a disruption takes place, the data that was read is not lost and, once the disruption is resolved, the reads may resume on the next or subsequent read. Accordingly, these example embodiments overcome limitations in card to device transactions where the user had to begin from the first read or first step of a transaction upon encountering a disruption.

A disruption as used herein may take many forms, including, without limitation, the movement of a contactless card or other transmitting device outside the communication field or communication range of a POS device, terminal, or other receiving device, signal interference, and signal blocking or jamming. It is understood that the present disclosure may apply to any obstacle to data communication.

Figure 1:
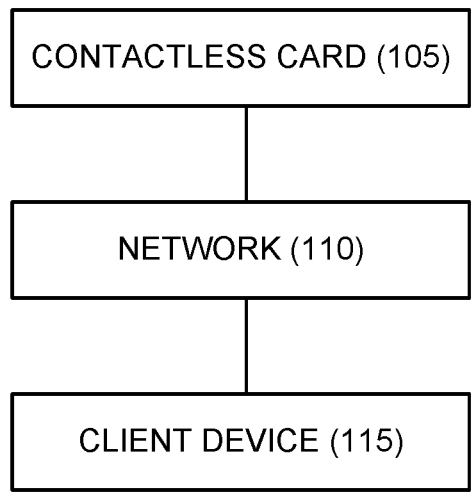
FIG. 1 is a diagram of a transaction system according to an example embodiment.

FIG. 1 illustrates a transaction system 100 card according to an example embodiment. As further discussed below, transaction system 100 may include a transmitting device such as a contactless card 105, network 110, and a receiving device such as a client device 115. Although FIG. 1 illustrates single instances of the components, transaction system 100 may include any number of components.

Transaction system 100 may include one or more contactless cards 105, which are further explained below with reference to FIGS. 2A-2B. In some embodiments, contactless card 105 may be in wireless communication, utilizing NFC in an example, with client device 115.

Transaction system 100 may include one or more networks 110. In some examples, network 110 may be one or more of a wireless network, a wired network or any combination of wireless network and wired network, and may be configured to connect client device 115 to contactless card 105. For example, network 110 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 110 may include, without limitation, telephone lines, fiber optics, IEEE Ethernet 902.3, a wide area network, a wireless personal area network, a LAN, or a global network such as the Internet. In addition, network 110 may support an Internet network, a wireless communication network, a cellular network, or the like, or any combination thereof. Network 110 may further include one network, or any number of the exemplary types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more examples, network 110 may comprise a plurality of interconnected networks, such as, for example, the Internet, a service provider's network, a cable television network, corporate networks, such as credit card association networks, and home networks.

Transaction system 100 may include client device 115, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 115 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

Figure 2A:
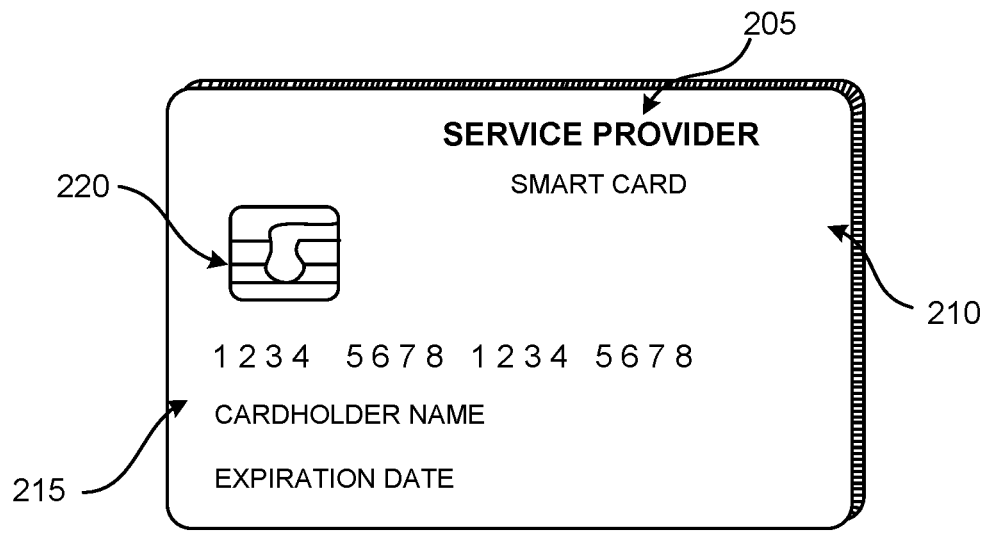
FIG. 2A is an illustration of a contactless card according to an example embodiment.

FIG. 2A illustrates one or more contactless cards 200, which may comprise a payment card, such as a credit card, debit card, or gift card, issued by a service provider 205 displayed on the front or back of the card 200. In some examples, the payment card may comprise a dual interface contactless payment card. The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, such as a user device, smart phone, laptop, desktop, or tablet computer. The contactless card 200 may also include processing circuitry, antenna and other components not shown in FIG. 2A. These components may be located behind the contact pad 220 or elsewhere on the substrate 210. The contactless card 200 may also include a magnetic strip or tape, which may be located on the back of the card (not shown in FIG. 2A).

Figure 2B:
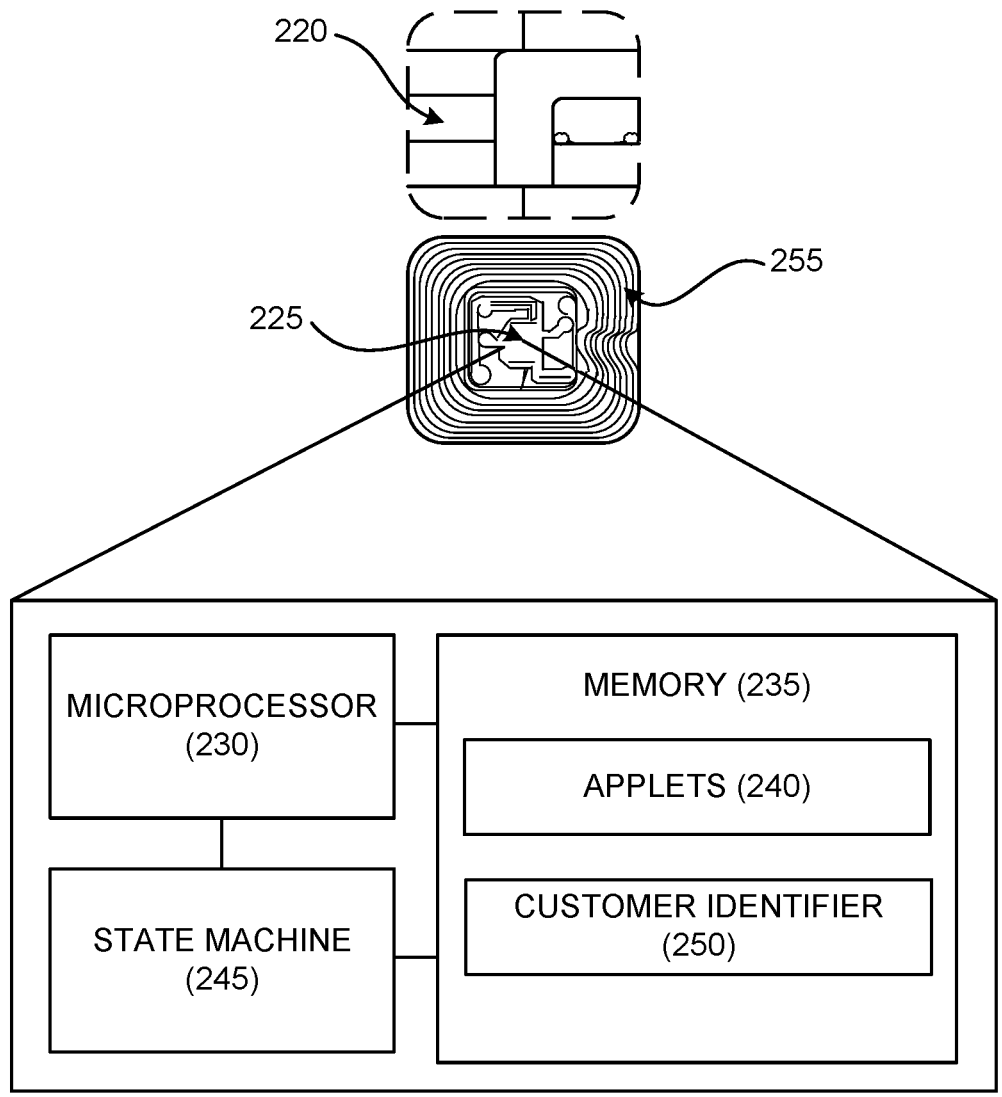
FIG. 2B is an illustration of a contact pad of the contactless card according to an example embodiment.

As illustrated in FIG. 2B, the contact pad 220 of FIG. 2A may include processing circuitry 225 for storing and processing information, including a microprocessor 230 and a memory 235. It is understood that the processing circuitry 225 may contain additional components, including, processors, memories, error and parity/CRC checkers, data encoders, anticollision algorithms, controllers, command decoders, security primitives and tamperproofing hardware, as necessary to perform the functions described herein.

The memory 235 may be a read-only memory, write-once read-multiple memory or read/write memory, e.g., RAM, ROM, and EEPROM, and the contactless card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 235 may be configured to store one or more applets 240. The one or more applets 240 may comprise one or more software applications configured to execute on one or more contactless cards 200, such as Java Card applet. However, it is understood that applets 240 are not limited to Java Card applets, and instead may be any software application operable on contactless cards or other devices having limited memory. The customer identifier 250 may comprise a unique alphanumeric identifier assigned to a user of the contactless card 200, and the identifier may distinguish the user of the contactless card 200 from other contactless card users. In some examples, the customer identifier 250 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 220 or entirely separate from it, or as further elements in addition to processor 230 and memory 235 elements located within the contact pad 220.

Memory 235 may contain one or more state machines 245. The one or more state machines 245 may be in communication with microprocessor 230 and may be configured to perform one or more steps in furtherance of a transaction, authentication, or other operation involving the contactless card. For example, the state machine 245 may record actions performed by the one or more applets in furtherance of a pending transaction, such as transmitted commands, selected and retrieved data, located files, and the generation of a cryptogram in furtherance of a pending transaction.

The state machine of the present disclosure is not limited to storage in the memory 235 of the contactless card 200. State machine 245 may be separate from memory 235. As another example, FIG. 3, described below, illustrates a client device containing a state machine. It is understood that state machine could be contained in a contactless card or other transmitting device, a client device or other receiving device, a server, or other device involved in the instant transaction or operation.

In some examples, the state machine 245 may allow for the resumption of a disrupted transaction. In some examples, the state machine 245 may record the data communications, data reads, and data writes previously exchanged between the contactless card and may allow for the resumption of the transaction following the most recent data communication, data read, or data write.

The state machine 245 may be stored in non-persistent memory or persistent memory. In some examples, the state machine 245 may be Java-based, such as a Java enumeration state machine (i.e., a state machine implemented using the Java enum data type). The state machine 245 may have one or more modes, depending upon the current state of the state machine 245. The modes may allow the state machine 245 to resume a disrupted transaction. For example, the state machine may be in a hypertext transfer protocol (HTTP) state when a transaction is disrupted, and the state machine 245 may return to this state upon resumption of the transaction.

In some examples, the contactless card 200 may comprise one or more antennas 255. The one or more antennas 255 may be placed within the contactless card 200 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

As explained above, the contactless cards 200 may be built on a software platform operable on smart cards or other devices having limited memory, such as JavaCard, and one or more or more applications or applets may be securely executed. Applets may be configured to respond to one or more requests, such as near field data exchange requests, from a reader, such as a mobile device NFC reader.

Figure 3:
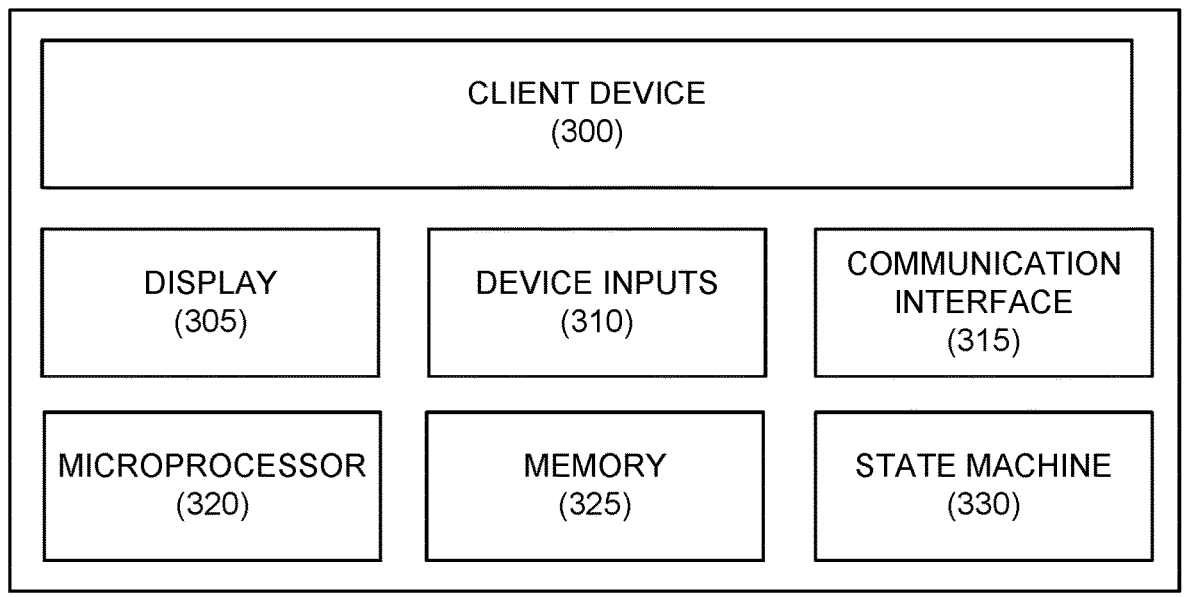
FIG. 3 is a diagram of a client device according to an example embodiment.

FIG. 3 illustrates a client device 300 according to an example embodiment. Client device 300 may be any of the client devices described above with reference to FIG. 1. As shown in FIG. 3, client device 300 can include a display 305, device inputs 310, a communication interface 315, a processor 320, a memory 325, and a state machine 330.

The display 305 may be any type of device for presenting visual information such as a computer monitor, a flat panel display, and a mobile device screen, including liquid crystal displays, light-emitting diode displays, plasma panels, and cathode ray tube displays.

The device inputs 310 may include any device for entering information into the client devices that is available and supported by the client device 300, such as a touch-screen, keyboard, mouse, cursor-control device, touch-screen, microphone, digital camera, video recorder, or camcorder.

The device inputs 310 may be used to enter information and interact with the client device 300 and by extension with the systems described herein.

The communication interface 315 can include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. This network may include, without limitation, telephone lines, fiber optics, IEEE Ethernet 902.3, a wide area network, a local area network, a wireless personal area network, a wide body area network or a global network such as the Internet. The client device 300 can also support a short-range wireless communication interface, such as NFC, radio-frequency identification, and Bluetooth, through communication interface 315, along with radio transmissions.

The microprocessor 320 may include a processor and associated processing circuitry, and may contain additional components, including processors, memories, error and parity/CRC checkers, data encoders, anticollision algorithms, controllers, command decoders, security primitives and tamperproofing hardware, as necessary to perform the functions described herein.

The memory 325 may be a read-only memory, write-once read-multiple memory or read/write memory, e.g., RAM, ROM and EEPROM, and the client device 300 can include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 325 may contain one or more state machines 330. In some examples, the state machine 330 may be the same or similar to the state machine 245 described with reference to FIG. 2B. For example, the one or more state-ment machines 330 may be in communication with microprocessor 320 and may transmit commands, select and retrieve data, and locate files, and generate a cryptogram during a transaction, authentication, or other operation involving the client device 300.

Figure 4:
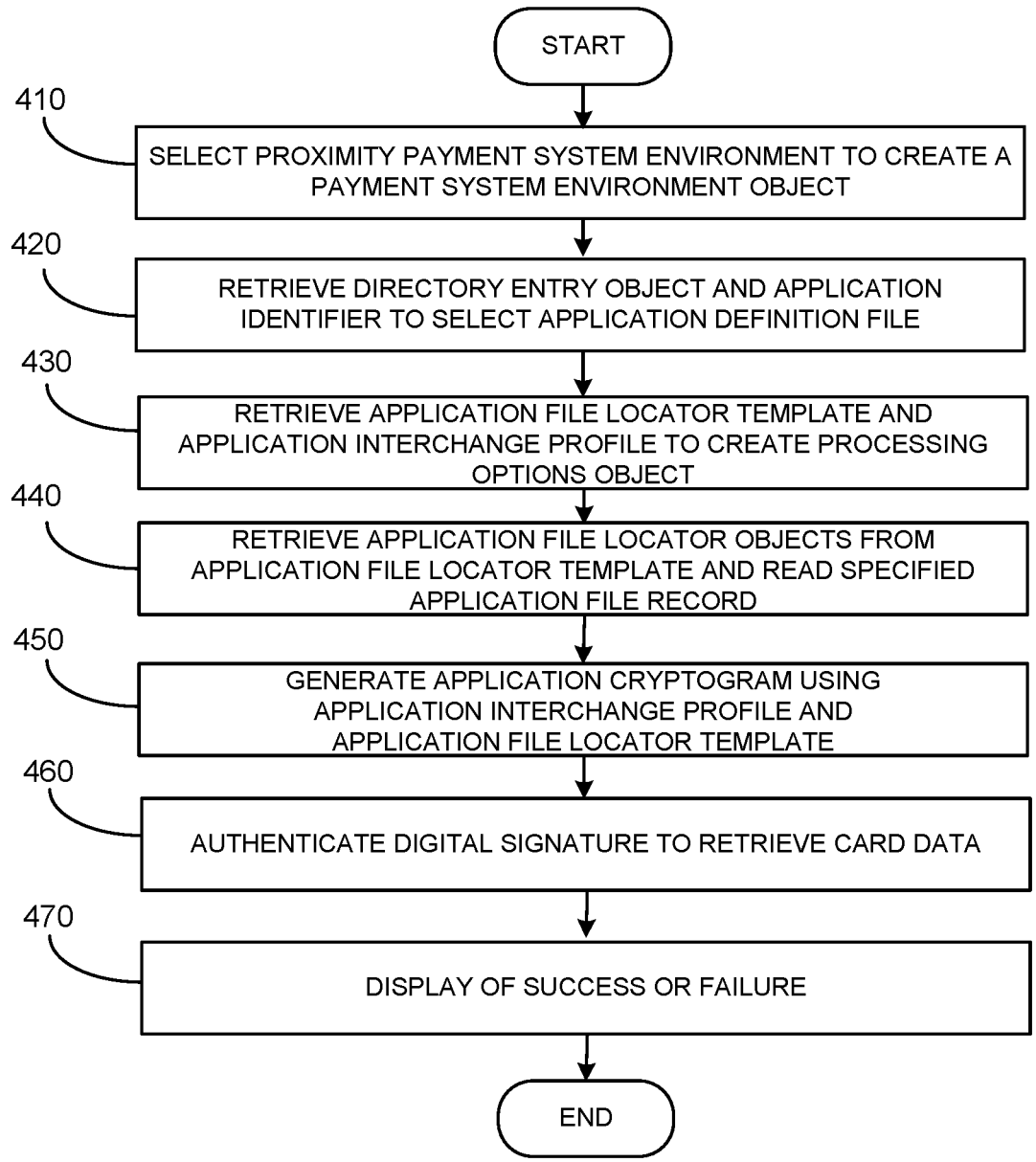
FIG. 4 is a flowchart illustrating a transaction method recorded by a state machine according to an example embodiment.

FIG. 4 is a flowchart illustrating a transaction method 400 that may be recorded by a state machine according to an example embodiment. Method 400 may reference same or similar components as illustrated in FIG. 1, FIG. 2A, FIG. 2B, and FIG. 3. In the example illustrated in FIG. 4, the method 400 may be performing an EMV transaction in a manner consistent with the EMV standard, and the state machine may be stored in the memory of a client device. However, it is understood that the present disclosure is not limited to EMV transactions and storing state machines in client devices, and the state machine may be stored in any transmitting or receiving device and may be configured to record any action, operation, or transaction involving a transmitting device and a receiving device.

The method 400 may commence at block 410, where the state machine may record a command, such as an application protocol data unit (APDU) command (C-APDU), to select the proximity payment system environment (PPSE). A response to the command, such as the command response (R-APDU), may comprise a list of all combinations supported by the contactless card. The PPSE may be used in the entry point combination selection process. The combinations may comprise a list of application definition files (ADFs) and their associated kernel identifiers. From the data in the R-APDU, a payment system environment (PSE) object may be created.

In some examples, the state machine may record the transmission of a C-APDU to select one or more ADFs from the data from the result of the PPSE select command response (R-APDU). Then, at block 420, a directory entry (DE) object may be retrieved from the highest priority PSE, and a corresponding application identifier (AI) may be retrieved, which may be used to send a C-APDU to select one or more ADFs. From the data in the R-APDU command response, an ADF object may be created.

At block 430, using data from the one or more ADFs, the state machine may record the presentation of a C-APDU to obtain processing options. From the data in the R-APDU, an application file locator template (AFLT) and an application interchange profile (ACP) may be created, which may be used to generate a processing options (PO) object.

Next, at block 440, the state machine may record the retrieval of a list of application file locator (AFL) objects from the AFLT. For each AFL object on the list, a C-APDU may be transmitted to read the specified Application File Record (AFR).

The state machine may record the generation of an application cryptogram (AC) at block 450. For example, using the AFLT and ACP, a C-APDU may be transmitted to the card to generate an AC from the data in the resulting R-APDU.

Upon completion of the previous steps, the state machine may record the performance of an authentication operation at block 460. For example, using the previously created PSE, DE, ADF, AFLT, PO and AC objects, a digital signature may be authenticated. Upon successful authentication, data such as card data, primary account number (PAN), expiration date, card holder name, preferred name, card verification value (CVV), issuer, and any other identifier, may be retrieved.

Upon completion of the authentication operation, the state machine may record the display of an indicator of success or failure at block 470. For example, an error message associated with the failure may be displayed to the user via a user interface of the client.

In some examples, the state machine may store a predetermined threshold that is designated as the failed number of attempts prior to display of the error message, e.g., 2, 3, 4, 5, or more failed attempts. In the case of the failure due to one or more disruptions, which may occur at any step, the user may be prompted to position and/or guide the contactless card back into the field, and the state machine may be configured to automatically resume at the last successful step. In other examples, there may be a predetermined threshold number of attempts before the user is prompted.

Figure 5:
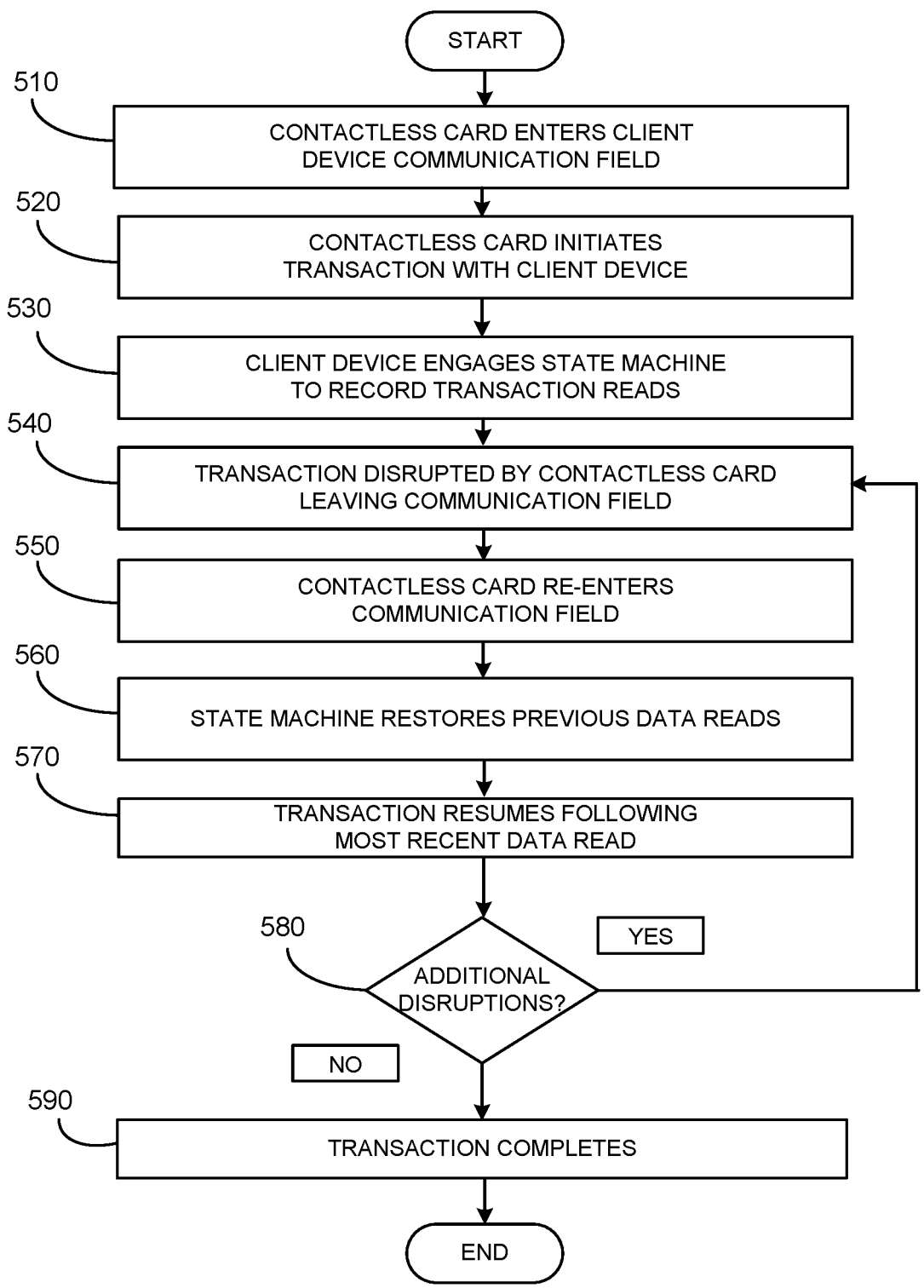
FIG. 5 is a flowchart illustrating a method of initiating and resuming a transaction according to an example embodiment.

FIG. 5 is a flowchart illustrating a method 500 of initiating and resuming a transaction according to an example embodiment. The method 500 may reference same or similar components as illustrated in FIG. 1, FIG. 2A, FIG. 2B, and FIG. 3. For example, the transaction may comprise a plurality of data communications, data reads, and data writes involving a contactless card and a client device.

The method 500 may commence at block 510, where a contactless card enters the communication field of a client device. In some examples, upon entry into the communication field, the contactless card may initiate a transaction with the client device at block 520. Alternatively, the client device may detect the entry of the contactless card into the communication and initiate a transaction by sending a read request to the contactless card.

At block 530, immediately upon the commencement of the transaction, the client device may engage a state machine to record the data communications, data reads, and data writes performed by the client device and the data communications between the contactless card and the client device. In some examples, the state machine may operate in the manner described with reference to FIG. 2B, FIG. 3 or FIG. 4, however, the present disclosure is not limited thereto and the state machine may function differently, i.e., as required by the contactless card, the client device, and the transaction.

At block 540, the transaction may be disrupted, e.g., by the contactless card leaving the communication field of the client device. Due to the disruption, one or more steps of the transaction may not be performed and the transaction may not progress further.

The transaction may be remedied at block 550 by, e.g., the re-entry of the contactless card into the communication field. Upon re-entry of the contactless card into the communication field, the state machine may restore the previous data reads, data write, or data communication performed by the client device at block 560. Since the state machine has recorded the data writes, data reads, and data communications performed by the client device, the state machine may retrieve the recorded data from its associated memory and provide the recorded information to the client device. By doing so, the state machine may bring the transaction back to the point immediately prior to the disruption. Due to the restoration performed by the state machine, the transaction can resume at the step immediately following the restored data read, data write, or data communication at block 570.

The transaction may subsequently proceed until one or more additional disruptions may occur. If at block 580, a second disruption occurs, the method 500 may return to block 540 where transaction may be disrupted. Then the method 500 may proceed as previously discussed, through the resolution of the disruption (block 550), restoration of the most recent data read, data write, or data communication by the state machine (block 560), and resumption of the transaction (block 570). If no further disruptions occurred at block 580, the transaction may be completed at block 590.

FIGS. 6A-6E illustrate a series of application interfaces 610-650 displayed on the application user interface 600 of a client device involved in a transaction with a contactless card according to an example embodiment. The application user interface 600 may be displayed on a smartphone, tablet computer, laptop computer, desktop computer, or any other client device where an application involved in or managing a transaction has been installed or may be deployed.

Figure 6A:
FIGS. 6A-6E illustrate a series of application user interfaces according to example embodiments.

As shown in FIG. 6A, the application user interface 600 may present an application interface 610 showing the details of a pending transaction. The application interface 610 may display, without limitation, merchant name, merchant location, transaction date, transaction time, transaction amount, and payment. In some examples, the transaction can be approved for processing by tapping, waving or otherwise gesturing a contactless card within the communication field of the client device. A card read button that, when pressed, initiates a read of the card may be displayed.

Figure 6B:
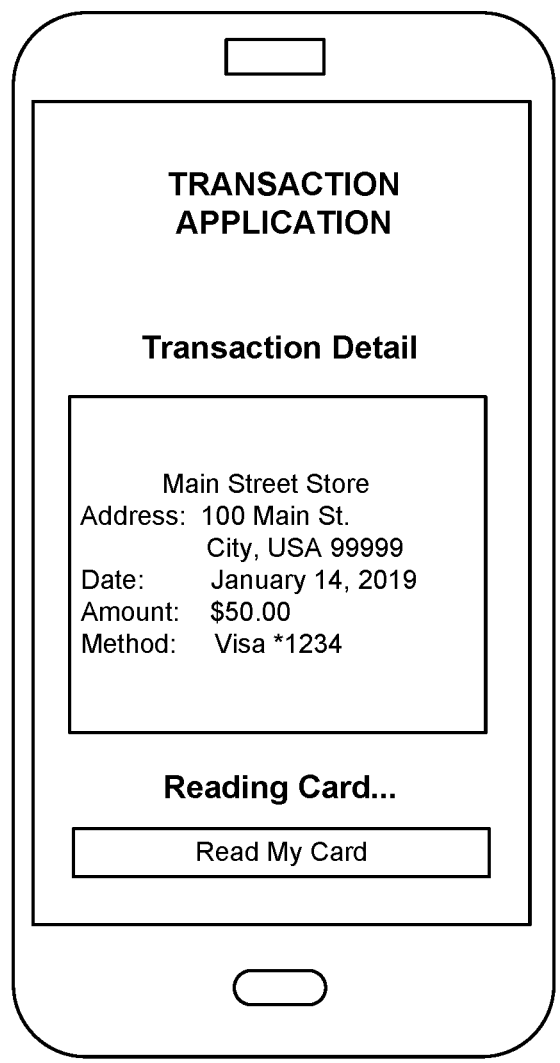

As shown in FIG. 6B, the application user interface 600 may present a card reading interface 620 that, upon the tap, wave, or other gesture of the contactless card within the communication field of the client device and/or the press of the card read button, may display a message that the client device card is reading the contactless card and the transaction is progressing towards completion. In some examples, at this point, a state machine may be engaged to monitor and record the data communication, data reads, and data writes between the contactless card and the client device.

Figure 6C:

As shown in FIG. 6C, the application user interface 600 may present an interruption interface 630 that may be displayed when the transaction involving the client device and contactless card has been disrupted, e.g., when the contactless card is removed from the communication field of the client device prior to the completion of the data communications, data reads, and data writes required for the transaction. The message displayed may be intended to inform a user that corrective action is required to complete the transaction including, without limitation, returning the contactless card to the communication field of the client device.

Figure 6D:
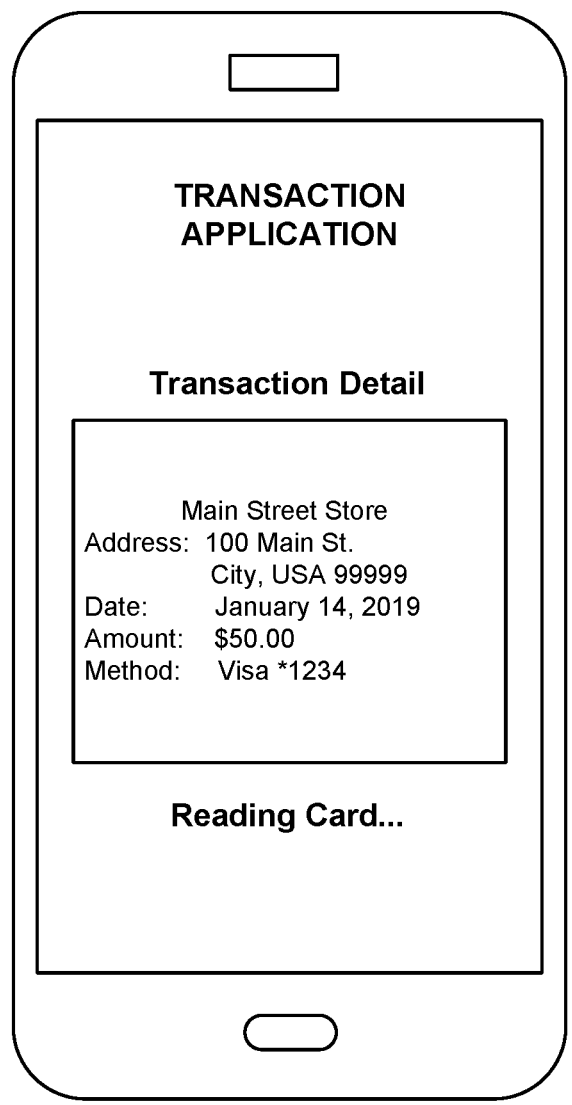

As shown in FIG. 6D, the application user interface 600 may present a resumed reading interface 640 when the disruption has been remedied, e.g., when the contactless card has re-entered the communication field of the client device. In some examples, at this point, the state machine may allow the transaction to resume immediately following the most recently completed step.

Figure 6E:

As shown in FIG. 6E, the application user interface 600 may present a transaction completed interface 650 when the transaction has been completed.

In some examples, additional disruptions may occur prior to the completion of the transaction, and the interruption interface 630 may be displayed prior to the transaction completed interface 650. In those examples, upon resolution of the transaction, the resumed reading interface 640 may be displayed and the state machine may again allow the transaction to resume immediately following the most recently completed step. This process may be repeated until no further disruptions are encountered and the transaction is completed, resulting in the display of the transaction completed interface 650.

Embodiments of the present disclosure describe systems and methods using state machines to improve the efficiency and reliability of contactless card transactions involving a client device, often at a lower power consumption than traditional POS devices or other terminals. The increased efficiency and reliability may be particularly valuable when completing sensitive transactions, such as card activations, commercial transactions, financial transactions, and transactions involving personally identifiable information. In addition, by increasing transaction efficiency and reliability and improving the resumption of disrupted transactions, the systems and methods of the present disclosure may promote the use of lower power consumption transmission methods, e.g., NFC, by reducing the impact of disruptions.

Throughout the specification, reference is made to a contactless card functioning as a transmitting device, however, the present disclosure is not limited to contactless cards. It is understood that the transmitting device may be a contactless card or may be another device, such as client device, capable of engaging in a transaction and performing the functions described herein.

Throughout the specification, reference is made to a transaction between a transmitting device and a receiving device (e.g., an EMV transaction involving a contactless cards and a client device), however, the present disclosure is not limited thereto. It is understood that the present disclosure includes any action, transaction, or operation involving a transmitting device and a receiving device, including without limitation a commercial or financial transaction, an activation operation, and an authentication operation, a step up authentication process, etc. It is further understood that both the transmitting device and the receiving device can, in the course of an action, transaction, or operation, transmit and receive data. That is, the transmitting device is not limited to the transmission of data, and the receiving device is not limited to the receipt of data.

Throughout the specification, reference is made to a disruption and a contactless card leaving the communication field of a client device, however, the present disclosure is not limited to such disruptions. Rather, it is understood that a disruption may be any manner of blockage, disruption, interference, interruption or obstacle that precludes or inhibits the data communications, data reads, or data writes required by an action, operation, or transaction between a transmitting device and a receiving device.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A transaction system comprising:
   a contactless card having a processor and a memory;
   an application comprising instructions for execution on a receiving device having a processor and a memory; and
   a state machine in data communication with one or more of the processor of the contactless card and the processor of the receiving device,
   wherein, upon initiation of a transaction involving the contactless card and the receiving device, the state machine is configured to communicate with the application and record one or more of a data communication, data read, and a data write between the contactless card and the application,
   wherein, upon an occurrence of a disruption that interrupts the transaction,
   the state machine is configured to preserve the most recent data communication, data read, or data write between the contactless card and the application, and
   the application is configured to display a prompt identifying the occurrence of the disruption and requesting a return entry of the contactless card into a communication field of the receiving device,
   wherein, upon resolution of the disruption, the state machine is configured to resume the transaction at a resumption step immediately following the most recent data communication, data read, or data write between the contactless card and the application, the resolution associated with the return entry of the contactless card into the communication field of the receiving device, and
   wherein the application is configured to display an indication of a read status of the contactless card prior to displaying the prompt and after displaying the prompt.

2. The transaction system of claim 1, wherein the state machine is contained in the memory of the contactless card.

3. The transaction system of claim 1, wherein the state machine is contained in the memory of the receiving device.

4. The transaction system of claim 1, wherein the state machine is further configured to:
   record the transmission of a first command to select a proximity payment system environment;
   record the receipt of a first response to create a payment system environment object;
   record the transmission of a second command to select an application definition file from the first response;
   record the receipt of a second response to create an application definition file object;
   record the transmission of a third command to obtain one or more processing options;
   record the receipt of a third response to create a processing options object based on an application file locator template and application profile;
   record the transmission of a fourth command to read an application file record for each application file locator based on one or more objects from the application file locator template;
   record the receipt of a fourth response comprising the read for each application file locator;

record the transmission of a fifth command to generate an application cryptogram based on the application file locator template and application profile;

record the receipt of a fifth response comprising the application cryptogram;

record the authentication of a digital signature associated with the application cryptogram;

record the retrieval of card data based on the authentication;

record the transmission of the card data, and record the receipt of the transmitted card data based on the authentication.

5. The transaction system of claim 4, wherein the second response comprises a list of application definition files and associated kernel identifiers supported by the contactless card.

6. The transaction system of claim 4, wherein the application is configured to display one or more notifications indicative of success or failure associated with the authentication.

7. The transaction system of claim 4, wherein the application definition file object is based on at least one of a directory entry object and application identifier.

8. The transaction system of claim 7, wherein the directory entry object is associated with a priority.

9. The transaction system of claim 4, wherein the state machine is configured to retrieve a list of application file locator objects from the application file locator template.

10. The transaction system of claim 1, wherein the state machine is configured to resume the transaction a predetermined number of times prior to a display of a failure notification.

11. The transaction system of claim 1, wherein the state machine is configured to attempt to resume the transaction a predetermined number of times prior to a display of a failure notification.

12. The transaction system of claim 1, wherein the receiving device further includes a near field communication (NFC) interface configured to generate an NFC field, and the disruption is caused when the contactless card exits the NFC field.

13. The transaction system of claim 12, wherein the disruption is resolved when the contactless card re-enters the NFC field.

14. A method of performing a transaction comprising the steps of:

generating, by a communication interface of a receiving device, a communication field, the receiving device further comprising a processor and a memory and including an application comprising instructions for execution on the receiving device;

detecting, by the application, an entry of a contactless card into the communication field;

initiating, by the contactless card, a transaction involving the application;

engaging, by the contactless card, a state machine;

recording, by the state machine, one or more data reads performed by the application in connection with the transaction;

determining, by the application, an exit of the communication field by the contactless card;

determining, by the application, an occurrence of a disruption of the transaction;

displaying, by the application, a prompt identifying the occurrence of the disruption and requesting re-entry of the contactless card into the communication field;

displaying, by the application, an indication of a read status of the contactless card prior to displaying the prompt and after displaying the prompt;

detecting, by the application, the re-entry of the contactless card into the communication field; and resuming, by the state machine, the transaction at a resumption step immediately following one of the one or more data reads.

15. The method of performing a transaction of claim 14, wherein the state machine continually records data reads performed by the application in connection with the transaction.

16. The method of performing a transaction of claim 15, wherein the state machine continually records data communications and data writes performed by the application in connection with the transaction.

17. The method of performing a transaction of claim 14, wherein initiating the transaction requires gesturing, associated with the contactless card, within the communication field.

18. The method of performing a transaction of claim 14, wherein the resumption step is the most recent data read performed by the application.

19. A client device for performing a transaction, comprising:

a processor;

a memory containing a state machine and an application comprising instructions for execution on the client device;

a near field communication (NFC) interface configured to generate an NFC field;

wherein, upon detection by the application, of entry of a contactless card into the NFC field, the application is configured to:

initiate a transaction involving the contactless card, and engage a state machine to preserve the most recent data read performed by the application; and wherein, upon detection by the application, of exit of the contactless card from the NFC field prior to completion of the transaction, the application is configured to:

retrieve the most recent data read from the state machine, display a prompt identifying an occurrence of a disruption that interrupts the transaction due to the exit of the contactless card from the NFC field and requesting a return entry of the contactless card into the NFC field, after the return entry of the contactless card into the NFC field, resume the transaction at a step immediately following the most recent data read, and display an indication of a read status of the contactless card prior to displaying the prompt and after displaying the prompt.

20. The client device of claim 19, wherein the application is further configured to resume the transaction a predetermined number of times prior to displaying a failure notification.

* * * * *